United States Patent
Xu et al.

(10) Patent No.: US 12,382,978 B2
(45) Date of Patent: Aug. 12, 2025

(54) LOW LOSS-OF-SOUP FISH BALL WITH FILLINGS AND THE METHOD OF PREPARING THE SAME

(71) Applicants: Jiangnan University, Wuxi (CN); Taizhou Anjoy Foods Co., LTD., Xinghua (CN)

(72) Inventors: Yanshun Xu, Wuxi (CN); Heng Jiang, Wuxi (CN); Lixin Fan, Wuxi (CN); Jianlian Huang, Wuxi (CN); Dongna Ruan, Wuxi (CN); Cikun Liu, Wuxi (CN); Xu Chen, Wuxi (CN); Wenshui Xia, Wuxi (CN); Yuan Yao, Wuxi (CN); Dawei Yu, Wuxi (CN)

(73) Assignees: Jiangnan University, Wuxi (CN); Taizhou Anjoy Foods Co., LTD., Xinghua (CN)

( * ) Notice: Subject to any disclaimer, the term of this patent is extended or adjusted under 35 U.S.C. 154(b) by 496 days.

(21) Appl. No.: 18/146,345

(22) Filed: Dec. 23, 2022

(65) Prior Publication Data
US 2023/0225380 A1   Jul. 20, 2023

(30) Foreign Application Priority Data
Jan. 14, 2022   (CN) .................. 202210044684.X

(51) Int. Cl.
A23L 17/10    (2016.01)
A23B 4/06     (2006.01)
A23L 17/00    (2016.01)
A23L 29/256   (2016.01)
A23L 29/269   (2016.01)
A23P 20/25    (2016.01)

(52) U.S. Cl.
CPC .............. *A23L 17/10* (2016.08); *A23B 4/068* (2013.01); *A23L 17/70* (2016.08); *A23L 29/256* (2016.08); *A23L 29/271* (2016.08); *A23P 20/25* (2016.08)

(58) Field of Classification Search
None
See application file for complete search history.

(56) References Cited

FOREIGN PATENT DOCUMENTS

CN       212368302 U  *  1/2021

* cited by examiner

*Primary Examiner* — Jyoti Chawla
(74) *Attorney, Agent, or Firm* — IDEA Intellectual Limited; Sam T. Yip

(57) ABSTRACT

A frozen stuffed fish ball with low soup loss and the method of preparing the same. By combining hydrocolloid and oil pre-emulsification technology, the problems of taste of powder, soup loss of fish balls after freeze-thaw cooking and the taste of frozen stuffed fish balls after freeze-thaw cooking are solved. The use of konjac gum and carrageenan or curdlan respectively, combined with oil pre-emulsification technology, also effectively improves the texture and brightness of the outer skin of fish balls. Compared with a single addition of conventional technology, the hardness, elasticity and brightness are increased, solving loosen structure, brightness and other problems due to freeze-thaw cycle. Further, it may be used in the fish ball processing line for preparing fish ball with fillings and other stuffed surimi products.

10 Claims, 1 Drawing Sheet

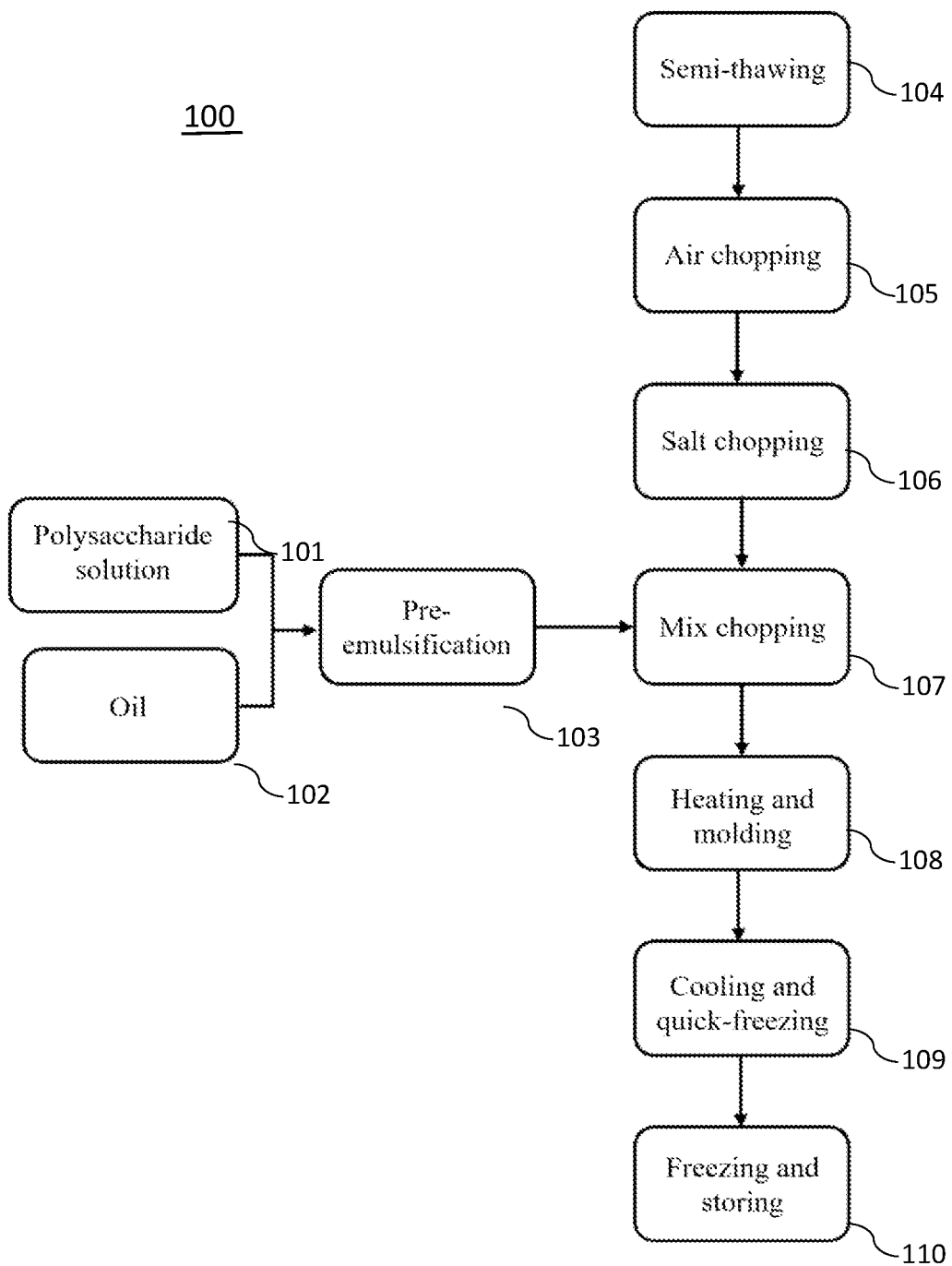

ature. The consequence is a certain degree of soup loss and a poor taste when re-cooked, which seriously affects the business development of the product and the economic benefits.

LOW LOSS-OF-SOUP FISH BALL WITH FILLINGS AND THE METHOD OF PREPARING THE SAME

FIELD OF THE INVENTION

The present invention generally relates to the field of aquatic product processing. More specifically the present invention relates to a low-loss-of-soup fish ball with fillings and the method of preparing the same.

BACKGROUND OF THE INVENTION

Fish ball with fillings, also known as bao-xin yu wan, has a broad market prospect, and it is favored by consumers for its fresh and juicy taste. When the product is heated and cooked, a small amount of soup in the filling will seep into the outer skin after a long period of frozen storage and circulation. The consequence is a certain degree of soup loss and a poor taste when re-cooked, which seriously affects the business development of the product and the economic benefits.

Therefore, the urgent problems in the aquatic product processing industry are as follows: how to control and improve the quality of surimi products in the process of freezing and storing, how to reduce the loss-of-soup after long-term frozen storage, and how to maintain the juicy taste of surimi products. The addressed issue is very important for improving the quality and industrial efficiency of surimi products.

Conventionally, konjac gum, cortisol and carrageenan have been widely used as conditioners to improve the gel strength and quality of surimi products. However, they are all aimed at the quality changes of unfilled surimi products in freezing and storing. There are not many improvement methods in the field to control the loss of soup during freezing and reheating. It is well known that the fillings of the stuffed surimi product are having poor stability after repeated freezing and thawing. Since the oil-water migration problem is serious, it is necessary to enhance the water and oil resistance of the surimi gel through the directional regulation of the surimi gel. The development of the key technology of preservation and quality control of the stuffed surimi products may significantly improve the soup taste and other edible quality of the stuffed fish balls products.

Currently, the processing of the fish ball with fillings product is mainly based on the invention of processing technology and equipment for stuffed fish balls with various characteristics of fillings. No prior arts have disclosed the quality control technology of the cooked fish ball with fillings products after the freezing or thawing process. Therefore, the hydrocolloid combined with pre-emulsification technology may not only reduce the loss of soup in surimi products, but also provide a processing method that is easy-to-use and time-saving, and so forth improve the water and oil barrier performance of surimi gel.

SUMMARY OF THE INVENTION

The purpose of this part is to outline some aspects of embodiments of the present invention and to briefly describe some preferred embodiments. Some simplifications or omissions may be made in this part and in the summary of the specification and the name of the invention of this application to avoid obscuring the purpose of this part, the summary of the specification and the name of the invention, and such simplifications or omissions cannot be used to limit the scope of the invention.

In view of the above and the problems in the prior art, the present invention is proposed.

Accordingly, it is an objective of the present invention to provide a low-loss-of-soup frozen fish ball with fillings and the method of preparing the same.

In accordance with an aspect of the present invention, the present invention provides the following technical solution: a method for preparing frozen stuffed fish balls with low soup loss, including: Pre-emulsifying the polysaccharide solution with edible oil, adding the surimi and mixing it with tapioca starch and water to obtain the frozen stuffed fish ball outer skin material with low soup loss, and using the outer skin material to wrap the inner filling to prepare fish balls with fillings.

In accordance with one embodiment of the present invention, said polysaccharide solution includes solute and solvent, wherein the solute is a mixture of konjac gum and curdlan or carrageenan. The mass ratio of konjac gum to curdlan or carrageenan is 9~5:5~1, and the solvent is water.

In accordance with another embodiment of the present invention, the mass ratio of solute of said polysaccharide solution to edible oil and surimi is 0.3:15~20:49~50.

In accordance with another embodiment of the present invention, said pre-emulsified oil to water ratio is 3:2.

In accordance with another embodiment of the present invention, the method further includes:

Semi-thawing: Thaw the frozen surimi at 4° C. to a central temperature of −5 to −2° C.

Air chopping: Cut the semi-thawed surimi into small pieces. Add phosphate and chop.

Salt chopping: Add salt to the air chopped surimi and chop to obtain the treated surimi.

Mix chopping: Dissolve the polysaccharide substance in water, mix with edible oil for pre-emulsification, add to the processed surimi and chop. Chop and mix well with tapioca starch and the remaining water to obtain the crust material for low-soup-loss frozen stuffed fish balls.

Preparing the filling: Chop lean meat into minced meat. Add salt and mix well. Add phosphate, auxiliary ingredients, and green onion and ginger water. Chop until the slurry is uniform and fine to obtain the fish ball with fillings.

Heating and molding: the outer skin material is wrapped around the filling to make fish balls, which are gelatinized and formed by the two-stage heating method.

Cooling and quick-freezing: the heated gelatinized fish balls are placed in cold water for cooling and quick-freezing.

Freezing and storing: Pack and store below −18° C.

In accordance with another embodiment of the present invention, said air chopping, further includes, said phosphate being a mixture of sodium tripolyphosphate, sodium hexametaphosphate and sodium pyrophosphate in the mass ratio of 1:1:1. The mass ratio of phosphate to semi-thawed surimi is 0.05~0.09:49~50.

In accordance with another embodiment of the present invention, said salt chopping further includes a mass ratio of table salt to air chopped surimi of 1.5~2:49~50.

In accordance with another embodiment of the present invention, the method includes preparing fillings of stuffed fish balls. Said phosphate is a mixture of sodium tripolyphosphate, sodium hexametaphosphate, sodium pyrophosphate in the mass ratio of 1:1:1; said green onion and ginger water is a mixture of green onion froth, ginger froth and water in the mass ratio of 3:3:4; said auxiliary ingredients are a mixture of lard, soy sauce and thirteen spices in the mass ratio of 20:2:1 mixture; said lean meat, salt, phosphate, auxiliary materials, green onion and ginger water in a mass ratio of 50:2:0.03:23:25.

In accordance with another embodiment of the present invention, said two-stage heating method is heated at 40° C. in a water bath for 30 min, and then heated at 90° C. in a water bath for 20 min.

In accordance with another embodiment of the present invention, said cooling and quick-freezing further includes: cooling the fish balls in cold water at 4° C. after heating and molding, and quick-freezing the fish balls after cooling until the central temperature of the fish balls is below 10° C.

Advantages of the Present Invention

The present invention provides a frozen stuffed fish ball with low soup loss and the method of preparing the same. The invention adopts the technical solution of combining hydrocolloid and oil pre-emulsification technology, which can effectively solve the taste of powdered, reduce the soup loss of fish balls after freeze-thaw cooking, reduce the soup loss rate of stuffed fish balls from 46.05% to 22.00%, and improve the juicy taste of frozen stuffed fish balls after freeze-thaw cooking. The use of konjac gum and carrageenan or curdlan respectively combined with oil pre-emulsification technology, may effectively improve the texture and brightness of the outer skin of fish balls. Compared with a single addition, its hardness is increased by 11.38%~42.23%, elasticity is increased by 4.76%~13.10%, and brightness from 80.19 to 81.06. The present invention is an effective solution to the fish balls due to freeze-thaw cycle leading to loosened structure, brightness, and other problems. Additionally, it effectively solves the problems of loosening structure and decreasing brightness due to freeze-thaw cycle.

The method of the invention is simple and easy to use for conventional fish ball production line without strict requirements. In addition, it may not only be widely applied to the current fish ball with fillings products, but also to other stuffed surimi and minced meat products.

BRIEF DESCRIPTION OF THE DRAWINGS

Embodiments of the invention are described in more details hereinafter with reference to the drawings, in which:

FIG. 1 depicts a flowchart for preparing a fish ball with fillings in accordance with an embodiment of the present invention.

DETAILED DESCRIPTION

In the following description, a low soup-loss frozen fish ball with fillings and the method of preparing the same and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In order to make the above-mentioned objects, features and advantages of the present invention more obvious and understandable, the following is a detailed description of specific embodiments of the present invention in conjunction with specific examples.

While many specific details are set forth in the following description to facilitate a full understanding of the invention, the invention may be implemented in other ways than those described herein, and similar extensions may be prepared by practitioners skilled in the in the art without contradicting the content of the invention based on the teachings of the present disclosure, so that the invention is not limited by the specific embodiments disclosed below.

Second, by "an embodiment" or "embodiment" herein is meant a particular feature, structure or characteristic that may be included in at least one embodiment of the present invention. The words "in an embodiment" appearing in various places in this specification do not all refer to the same embodiment, nor are they separate or selective from other embodiments that are mutually exclusive.

The frozen freshwater surimi used in the embodiment of the present invention is purchased from Honghu Xinhongye Aquatic Food Co.

The phosphate used in the embodiment of the invention is a mixture of sodium tripolyphosphate:sodium hexametaphosphate:sodium pyrophosphate in the ratio of 1:1:1 by mass.

The preparation method of green onion and ginger water used in the embodiment of the present invention is: green onion froth, ginger froth and water mixed in a mass ratio of 3:3:4.

The model of chopping and grinding machine used is: LZ25Easy235, with chopping speed of 2500-3000 r/min.

Embodiment 1

(1) Semi-thawing 104: frozen freshwater surimi is thawed to a central temperature of −5 to −2° C. at 4° C.

(2) Air chopping 105: cut the semi-thawed surimi into small pieces, add phosphate and chop for 3 min, and control the ambient temperature below 10° C. during chopping.

(3) Salt chopping 106: add salt and continue chopping for 3 min to obtain the processed surimi.

(4) Mix chopping 107: according to the curdlan:konjac gum is 3:7 mass ratio of the configuration of the composite solute, weigh the composite solute dissolved in a small amount of water and lard for pre-emulsification 103 with oil to water ratio of 3:2, add to the treated surimi, then add tapioca starch and the remaining water. Chop for 5 min, to obtain the outer skin material of the fish ball, where the mass ratio of surimi:water:tapioca starch:lard:salt:phosphate:complex solute is 49~50:18:15:15:2:0.09:0.3.

(5) Preparing the filling: chop lean meat pieces into minced meat, add edible salt and chop, then add phosphate, auxiliary ingredients, green onion and ginger water and chop until the slurry is uniform and delicate, to obtain the filling of the stuffed fish ball filling, where the mass ratio of lean meat, salt, phosphate, auxiliary ingredients, green onion and ginger water is 50:2:0.03:23:25.

(6) Heating and molding 108: the outer skin wrapped with the inner filling was made into fish balls, which were heated in a water bath at 40° C. for 30 min, and then heat in a water bath at 90° C. for 20 min, with a two-stage heating method to gelatinize them.

(7) Cooling and quick-freezing 109: the gelatinized fish balls are cooled in cold water at 4° C., and then quick-frozen after cooling until the central temperature of the fish balls is below 10° C.

(8) Freezing and storing 110: package and store below −18° C.

Embodiment 2

(1) Semi-thawing 104: frozen freshwater surimi is thawed at 4° C. to a central temperature of −5~−2° C.

(2) Air chopping 105: cut the semi-thawed surimi into small pieces, add phosphate and chop for 3 min, control the ambient temperature below 10° C. during chopping.

(3) Salt chopping 106: add salt and continue chopping for 3 min to obtain the processed surimi.

(4) Mix chopping 107: according to the curdlan:konjac gum is 1:9 mass ratio of the configuration of complex solute. Weigh the complex solute dissolved in a small amount of water and lard for pre-emulsification 103 with oil to water ratio of 3:2, and then add to the treated surimi. Add tapioca starch and the remaining water, chop for 5 min, to obtain the outer skin material of fish balls, where the mass ratio of surimi:water:tapioca starch:lard:salt:phosphate:complex solute is 49~50:18:15:15:2:0.09:0.3.

(5) Preparing the filling: chop lean meat pieces into mince, add edible salt and chopping, then add phosphate, excipients, green onion and ginger water and chop until the slurry is uniform and delicate, to obtain the filling of the fish ball filling, where the mass ratio of lean meat, salt, phosphate, excipients, green onion and ginger water is 50:2:0.03:23:25.

(6) Heating and molding 108: the outer skin wrapped with the inner filling was made into fish balls, which were heated in a water bath at 40° C. for 30 min, and then heat in a water bath at 90° C. for 20 min, with a two-stage heating method to gelatinize them.

(7) Cooling and quick-freezing 109: the gelatinized fish balls are cooled in cold water at 4° C., and then quick-freeze after cooling until the central temperature of the fish balls is below 10° C.

(8) Freezing and storing 110: package and store below −18° C.

Embodiment 3

(1) Semi-thawing 104: frozen freshwater surimi is thawed to a central temperature of −5~−2° C. at 4° C.

(2) Air chopping 105: cut the semi-thawed surimi into small pieces, add phosphate and chop for 3 min, controlling the ambient temperature below 10° C. during chopping.

(3) Salt chopping 106: add salt and continue chopping for 3 min to obtain the processed surimi.

(4) Mix chopping 107: according to the curdlan:konjac gum is 5:5 mass ratio of the configuration of complex solute, weighed the complex solute dissolved in a small amount of water and lard for pre-emulsification 103, oil to water ratio of 3:2, and then add to the treated surimi. Add tapioca starch and the remaining water, chopping for 5 min, to obtain the outer skin material of fish balls, where the mass ratio of surimi:water:tapioca starch:lard:salt:phosphate:complex solute is 49~50:18:15:15:2:0.09:0.3.

(5) Preparing the filling: chop lean meat pieces into mince, add edible salt and chopping, then add phosphate, excipients, green onion and ginger water and chopping until the slurry is uniform and delicate, to obtain the filling of the fish ball filling, where the mass ratio of lean meat, salt, phosphate, excipients, green onion and ginger water is 50:2:0.03:23:25.

(6) Heating and molding 108: the outer skin wrapped with the inner filling was made into fish balls, which were heated in a water bath at 40° C. for 30 min, and then heated in a water bath at 90° C. for 20 min, with a two-stage heating method to gelatinize them.

(7) Cooling and quick-freezing 109: the gelatinized fish balls are cooled in cold water at 4° C., and then quick-freeze after cooling until the central temperature of the fish balls is below 10° C.

(8) Freezing and storing 110: package and store below −18° C.

Embodiment 4

(1) Semi-thawing 104: frozen freshwater surimi is thawed at 4° C. to a central temperature of −5~−2° C.

(2) Air chopping 105: cut the semi-thawed surimi into small pieces, add phosphate and chop for 3 min, and control the ambient temperature below 10° C. during chopping.

(3) Salt chopping 106: add salt and continue chopping for 3 min to obtain the processed surimi.

(4) Mix chopping 107: according to the mass ratio of carrageenan:konjac gum is 1:9 to configure the compound solute, weigh the compound solute dissolved in a small amount of water and lard for pre-emulsification 103, add to the treated surimi with oil to water ratio of 3:2, then add tapioca starch and the remaining water. Chop for 5 min to obtain the outer skin material of fish balls. The mass ratio of surimi:water:tapioca starch:lard:salt:phosphate:complex solute is 49~50:18:15:15:2:0.09:0.3.

(5) Preparing the filling: Chop lean meat pieces into mince, add edible salt and chop, then add phosphate, excipients, green onion and ginger water and chop until the slurry is uniform and delicate. Obtain the filling of the fish ball filling, where the mass ratio of lean meat, salt, phosphate, excipients, green onion and ginger water is 50:2:0.03:23:25.

(6) Heating and molding 108: the outer skin wrapped with the inner filling was made into fish balls, which were heated in a water bath at 40° C. for 30 min, and then heated in a water bath at 90° C. for 20 min, with a two-stage heating method to gelatinize them.

(7) Cooling and quick-freezing 109: the gelatinized fish balls are cooled in cold water at 4° C., and then quick-freeze after cooling until the central temperature of the fish balls is below 10° C.

(8) Freezing and storing 110: package and store below −18° C.

Embodiment 5

(1) Semi-thawing 104: frozen freshwater surimi is thawed at 4° C. to a central temperature of −5 to −2° C.

(2) Air chopping 105: cut the semi-thawed surimi into small pieces, add phosphate and chop for 3 min, and control the ambient temperature below 10° C. during chopping.

(3) Salt chopping 106: add salt and continue chopping for 3 min to obtain the processed surimi.

(4) Mix chopping 107: according to the mass ratio of carrageenan:konjac gum is 3:7 to configure the compound solute, weigh the compound solute dissolved in a small amount of water and lard for pre-emulsification 103, oil to water ratio of 3:2, and then add to the treated surimi, then add tapioca starch and the remaining water, chop for 5 min, to obtain the outer skin material of fish balls. The mass ratio of surimi:water:tapioca starch:lard:salt:phosphate:complex solute is 49~50:18:15:15:2:0.09:0.3.

(5) Preparing the filling: chop lean meat pieces into mince, add edible salt and chopping, then add phosphate, excipients, green onion and ginger water and chop until the slurry is uniform and delicate, to obtain the filling of the fish ball filling, where the mass ratio of lean meat, salt, phosphate, excipients, green onion and ginger water is 50:2:0.03:23:25.

(6) Heating and molding 108: the outer skin wrapped with the inner filling was made into fish balls, which were heated in a water bath at 40° C. for 30 min, and then heat in a water bath at 90° C. for 20 min, with a two-stage heating method to gelatinize them.

(7) Cooling and quick-freezing 109: the gelatinized fish balls are cooled in cold water at 4° C., and then quick-freeze after cooling until the central temperature of the fish balls is below 10° C.

(8) Freezing and storing 110: package and store below −18° C.

Embodiment 6

(1) Semi-thawing 104: frozen freshwater surimi is thawed at 4° C. to a central temperature of −5 to −2° C.

(2) Air chopping 105: cut the semi-thawed surimi into small pieces, add phosphate and chop for 3 min, control the ambient temperature below 10° C. during chopping.

(3) Salt chopping 106: add salt and continue chopping for 3 min to obtain the processed surimi.

(4) Mix chopping 107: according to the mass ratio of carrageenan:konjac gum is 5:5 to configure the compound solute, weigh the compound solute dissolved in a small amount of water and lard for pre-emulsification 103, oil to water ratio of 3:2. Add to the treated surimi, then add tapioca starch and the remaining water. Chop for 5 min to obtain the outer skin material of fish balls, where the mass ratio of surimi:water:tapioca starch:lard:salt:phosphate:complex solute is 49~50:18:15:15:2:0.09:0.3.

(5) Preparing the filling: chop lean meat pieces into mince, add edible salt and chopping, then add phosphate, excipients, green onion and ginger water and chop until the slurry is uniform and delicate to obtain the filling of the fish ball filling, where the mass ratio of lean meat, salt, phosphate, excipients, green onion and ginger water is 50:2:0.03:23:25.

(6) Heating and molding 108: the outer skin wrapped with the inner filling was made into fish balls, which were heated in a water bath at 40° C. for 30 min, and then heated in a water bath at 90° C. for 20 min, with a two-stage heating method to gelatinize them.

(7) Cooling and quick-freezing 109: the gelatinized fish balls are cooled in cold water at 4° C., and then quick-frozen after cooling until the central temperature of the fish balls is below 10° C.

(8) Freezing and storing 110: package and store below −18° C.

Counter Example 1

(1) Semi-thawing 104: frozen freshwater surimi is thawed at 4° C. until the central temperature is −5~−2° C.

(2) Air chopping 105: cut the semi-thawed surimi into small pieces, add phosphate and chop for 3 min, control the ambient temperature below 10° C. during chopping.

(3) Salt chopping 106: add salt and continue chopping for 3 min to obtain the processed surimi.

(4) Mix chopping 107: weigh the konjac gum dissolved in a small amount of water and lard for pre-emulsification 103, oil to water ratio of 3:2, and then add to the treated surimi. Add tapioca starch and the remaining water, chop for 5 min to obtain the outer skin material of fish balls, where the mass ratio of surimi:water:tapioca starch:lard:salt:phosphate:konjac gum is 49~50:18:15:15:2:0.09:0.3.

(5) Preparing the filling: lean meat pieces chopped into minced, add edible salt, then add phosphate, auxiliary ingredients, green onion and ginger water. Chop until the slurry is uniform and delicate, to obtain the filling of the fish ball filling, where the lean meat, salt, phosphate, auxiliary ingredients, green onion and ginger water has a mass ratio of 50:2:0.03:23:25.

(6) Heating and molding 108: the outer skin wrapped with the inner filling is made into fish balls, which were heated in a water bath at 40° C. for 30 min, and then heated in a water bath at 90° C. for 20 min, with a two-stage heating method to gelatinize them.

(7) Cooling and quick-freezing 109: the gelatinized fish balls are cooled in cold water at 4° C., and then quick-frozen after cooling until the central temperature of the fish balls is below 10° C.

(8) Freezing and storing 110: package and store below −18° C.

Counter Example 2

(1) Semi-thawing 104: frozen freshwater surimi is thawed at 4° C. until the central temperature is −5~−2° C.

(2) Air chopping 105: cut the semi-thawed surimi into small pieces, add phosphate and chop for 3 min, and control the ambient temperature below 10° C. during chopping.

(3) Salt chopping 106: add salt and continue chopping for 3 min to obtain the processed surimi.

(4) Mix chopping 107: Weigh the curdlan dissolved in a small amount of water and lard for pre-emulsification 103, oil to water ratio of 3:2, and then add to the treated surimi. Add tapioca starch and the remaining water. Chop and mix for 5 min to obtain the fish ball with fillings crust material, where the mass ratio of surimi:water:tapioca starch:lard:salt: phosphate:curdlan is 49~50:18:15:15:2:0.09:0.4.

(5) Preparing the filling: lean meat pieces chopped into minced, add edible salt chopped, and then add phosphate, auxiliary ingredients, green onion and ginger water and chop until the slurry is uniform and delicate to obtain the filling of fish ball filling, where the mass ratio of lean meat, salt, phosphate, auxiliary ingredients, green onion and ginger water is 50:2:0.03:23:25.

(6) Heating and molding 108: the outer skin wrapped with the inner filling is made into fish balls, which are heated in a water bath at 40° C. for 30 min, and then heat in a water bath at 90° C. for 20 min, with a two-stage heating method to gelatinize them.

(7) Cooling and quick-freezing 109: the gelatinized fish balls are cooled in cold water at 4° C., and then quick-frozen after cooling until the central temperature of the fish balls is below 10° C.

(8) Freezing and storing 110: package and store below −18° C.

Counter Example 3

(1) Semi-thawing 104: frozen freshwater surimi is thawed at 4° C. until the central temperature is −5~−2° C.

(2) Air chopping 105: cut the semi-thawed surimi into small pieces, add phosphate and chop for 3 min, control the ambient temperature below 10° C. during chopping.

(3) Salt chopping 106: add salt and continue chopping for 3 min to obtain the processed surimi.

(4) Mix chopping 107: weigh carrageenan dissolved in a small amount of water and lard for pre-emulsification 103 with oil to water ratio of 3:2, and add to the treated surimi. Add tapioca starch and the remaining water, chopping for 5 min, to obtain the outer skin material of the fish ball with fillings. where the mass ratio of surimi:water:tapiocastarch: lard:salt:phosphate:carrageenan is 49~50:18:15:15:2:0.09: 0.3.

(5) Preparing the filling: lean meat pieces are chopped into minced. Add edible salt chopped, and then add phosphate, auxiliary ingredients, green onion and ginger water chopped until the slurry is uniform and delicate, to obtain the filling of the fish ball filling, where the mass ratio of lean meat, salt, phosphate, auxiliary ingredients, green onion and ginger water is 50:2:0.03:23:25.

(6) Heating and molding 108: the outer skin wrapped with the inner filling was made into fish balls, which were heated in a water bath at 40° C. for 30 min, and then heated in a water bath at 90° C. for 20 min, with a two-stage heating method to gelatinize them.

(7) Cooling and quick-freezing 109: the gelatinized fish balls are cooled in cold water at 4° C., and then quick-frozen after cooling until the central temperature of the fish balls is below 10° C.

(8) Freezing and storing 110: package and store below −18° C.

Counter Example 4

(1) Semi-thawing 104: frozen freshwater surimi is thawed to a central temperature of −5~−2° C. at 4° C.

(2) Air chopping: cut the semi-thawed surimi into small pieces, add phosphate, and chop for 3 min. Control the ambient temperature below 10° C. during chopping.

(3) Salt chopping 106: add salt and continue chopping for 3 min to obtain the processed surimi.

(4) Mix chopping 107: weigh konjac gum and directly add to the treated surimi, then add lard, tapioca starch and water. Chop for 5 min to obtain the outer skin material of the fish ball with fillings. The mass ratio of surimi:water:tapioca starch:lard:salt:phosphate:konjac gum is 49~50:18:15:15:2:0.09:0.3.

(5) Preparing the filling: lean meat pieces chopped into minced, add edible salt chopped, and then add phosphate, auxiliary ingredients, green onion and ginger water. Chop until the slurry is uniform and delicate, to obtain the filling of the fish ball filling, where the lean meat, salt, phosphate, auxiliary ingredients, green onion and ginger water mass ratio of 50:2:0.03:23:25.

(6) Heating and molding 108: the outer skin wrapped with the inner filling was made into fish balls, which were heated in a water bath at 40° C. for 30 min, and then heat in a water bath at 90° C. for 20 min, with a two-stage heating method to gelatinize them.

(7) Cooling and quick-freezing 109: the gelatinized fish balls are cooled in cold water at 4° C. and quick-frozen after cooling until the central temperature of the fish balls is below 10° C.

(8) Freezing and storing 110: package and store below −18° C.

Counter Example 5

(1) Semi-thawing 104: frozen freshwater surimi is thawed to a central temperature of −5~−2° C. at 4° C.

(2) Air chopping 105: cut the semi-thawed surimi into small pieces, add phosphate, and chop for 3 min. Control the ambient temperature below 10° C. during chopping.

(3) Salt chopping 106: add salt and continue chopping for 3 min to obtain the processed surimi.

(4) Mix chopping 107: Weighing and adding cortisone directly into the treated surimi, then adding lard, tapioca starch and water. Chopping and mixing for 5 min to obtain the fish ball with fillings crust material. The mass ratio of surimi:water:tapioca starch:lard:salt:phosphate:curdlan is 49~50:18:15:15:2:0.09:0.3.

(5) Preparing the filling: lean meat pieces are chopped into minced. Add edible salt chopped, and then add phosphate, auxiliary ingredients, green onion and ginger water chopped until the slurry is uniform and delicate, to obtain the filling of fish ball filling, where the mass ratio of lean meat, salt, phosphate, auxiliary ingredients, green onion and ginger water is 50:2:0.03:23:25.

(6) Heating and molding 108: the outer skin wrapped with the inner filling was made into fish balls, which were heated in a water bath at 40° C. for 30 min, and then heated in a water bath at 90° C. for 20 min, with a two-stage heating method to gelatinize them.

(7) Cooling and quick-freezing 109: the gelatinized fish balls are cooled in cold water at 4° C., and then quick-frozen after cooling until the central temperature of the fish balls is below 10° C.

(8) Freezing and storing 110: package and store below −18° C.

Counter Example 6

(1) Semi-thawing 104: frozen freshwater surimi is thawed to a central temperature of −5~−2° C. at 4° C.

(2) Air chopping 105: cut the semi-thawed surimi into small pieces, add phosphate, chop for 3 min, and control the ambient temperature below 10° C. during chopping.

(3) Salt chopping 106: add salt and continue chopping for 3 min to obtain the processed surimi.

(4) Mix chopping 107: weigh carrageenan and add it directly into the treated surimi, then adding lard, tapioca starch and water, chopping for 5 min to obtain the outer skin material of the fish ball with fillings, where the mass ratio of surimi:water:tapiocastarch:lard:salt:phosphate:carrageenan is 49~50:18:15:15:2:0.09:0.3.

(5) Preparing the filling: lean meat pieces chopped into minced, add edible salt chopped, and then add phosphate, auxiliary ingredients, green onion and ginger water chopped until the slurry is uniform and delicate, to obtain the filling of the fish ball filling, where the mass ratio of lean meat, salt, phosphate, auxiliary ingredients, green onion and ginger water is 50:2:0.03:23:25.

(6) Heating and molding 108: the outer skin wrapped with the inner filling was made into fish balls, which were heated in a water bath at 40° C. for 30 min, and then heated in a water bath at 90° C. for 20 min, with a two-stage heating method to gelatinize them.

(7) Cooling and quick-freezing 109: the gelatinized fish balls are cooled in cold water at 4° C., and then quick-frozen after cooling until the central temperature of the fish balls is below 10° C.

(8) Freezing and storing 110: package and store below −18° C.

Counter Example 7

(1) Semi-thawing 104: frozen freshwater surimi is thawed to a central temperature of −5~−2° C. at 4° C.

(2) Air chopping 105: cut the semi-thawed surimi into small pieces, add phosphate, chop for 3 min, and control the ambient temperature below 10° C. during chopping.

(3) Salt chopping 106: add salt and continue chopping for 3 min to obtain the processed surimi.

(4) Mix chopping 107: add edible oil to the treated surimi, then add water, chopping for 5 min to obtain the fish ball with fillings outer crust material, where the mass ratio of surimi:water:tapiocastarch:lard:salt:phosphate: is 49~50:18:15:15:2:0.09.

(5) Preparing the filling: lean meat pieces chopped into minced, add edible salt chopped, and then add phosphate, auxiliary ingredients, green onion and ginger water chopped until the slurry is uniform and delicate, to obtain the filling of the fish ball filling, where the mass ratio of lean meat, salt, phosphate, auxiliary ingredients, green onion and ginger water is 50:2:0.03:23:25.

(6) Heating and molding 108: the outer skin wrapped with the inner filling was made into fish balls, which were heated in a water bath at 40° C. for 30 min, and then heated in a water bath at 90° C. for 20 min, with a two-stage heating method to gelatinize them.

(7) Cooling and quick-freezing 109: the gelatinized fish balls are cooled in cold water at 4° C., and then quick-frozen after cooling until the central temperature of the fish balls is below 10° C.

(8) Freezing and storing 110: package and store below −18° C.

Embodiment 7

Methods for Testing:
1. Soup Loss Rate Test.

Frozen fish balls are cut in half and the fillings are scooped out. Determine the filling moisture. Take another frozen fish balls and boil them for 15 min, absorb the visible water and grease on the surface of the fish balls with absorbent paper, cut the fish balls in half and scoop out the filling, and measure the filling moisture. Each group of samples was measured 10 times in parallel. It was found that the main component of soup loss was water, and this method was used to assess the soup loss by the rate of water loss in the filling before and after steaming, and to simplify the calculation. The dry base content of the fish ball filling before and after steaming is constant. Soup loss rate is calculated according to the following formula.
Soup Loss Rate $$(\%) = \frac{W_1 - W_2}{W_1} \times 100\% \quad (1)$$

Where $W_1$ is the moisture content of the filling before steaming, recorded in the dry filling basis.

$W_2$—the moisture content of the filling after steaming, recorded on the dry filling basis.

2. Texture Test.

The gel of the filling was cut into 1 cm*1.5 cm pieces, and the texture and shear force were tested by physical property analyzer. The test conditions for hardness, elasticity and chewiness of fish balls were cylindrical test probe p/25; pre-test speed: 5 mm/s; test speed: 1 mm/s; post-test speed: 5 mm/s; compression deformation: 50%; trigger force: 5 g.

3. Color Difference Test.

The outer skin gel of the produced stuffed fish balls is cut into thin slices in a thickness of 2 cm and measured in a spectrophotometer at room temperature with three parallel values for each sample.

The rate of soup loss and brightness of the embodiments 1~6 and the counter examples 1~7 of the present invention, are shown in Table 1.

TABLE 1

Results of loss-of-soup reduction rate and brightness.

|  | Soup loss rate (%) | Brightness |
| --- | --- | --- |
| Embodiment 1 | 22.00 ± 2.40 | 81.06 ± 2.19 |
| Embodiment 2 | 28.80 ± 1.31 | 80.68 ± 1.33 |
| Embodiment 3 | 33.10 ± 0.64 | 79.92 ± 0.74 |
| Embodiment 4 | 34.87 ± 0.13 | 78.67 ± 1.83 |
| Embodiment 5 | 30.97 ± 1.45 | 80.17 ± 2.21 |
| Embodiment 6 | 26.44 ± 0.67 | 80.72 ± 1.28 |
| Counter Example 1 | 35.92 ± 0.57 | 80.19 ± 1.46 |
| Counter Example 2 | 34.30 ± 1.50 | 81.35 ± 1.37 |
| Counter Example 3 | 37.81 ± 0.47 | 80.69 ± 0.72 |
| Counter Example 4 | 38.72 ± 0.36 | 81.66 ± 0.64 |
| Counter Example 5 | 39.40 ± 0.19 | 80.02 ± 2.80 |
| Counter Example 6 | 41.53 ± 1.42 | 78.17 ± 1.89 |
| Counter Example 7 | 46.05 ± 2.07 | 76.38 ± 1.52 |

TABLE 2

Results of texture test.

|  | Hardness/g | Elasticity | Cohesiveness/g | Resilience |
| --- | --- | --- | --- | --- |
| Embodiment 1 | 1815.99 ± 102.80 | 0.91 ± 0.09 | 1435.69 ± 134.55 | 0.43 ± 0.02 |
| Embodiment 2 | 1421.59 ± 155.40 | 0.95 ± 0.04 | 1121.63 ± 74.71 | 0.44 ± 0.02 |
| Embodiment 3 | 1543.87 ± 70.10 | 0.94 ± 0.05 | 1219.65 ± 97.80 | 0.47 ± 0.02 |
| Embodiment 4 | 1488.04 ± 133.30 | 0.88 ± 0.02 | 1175.79 ± 100.54 | 0.42 ± 0.01 |
| Embodiment 5 | 1810.82 ± 95.43 | 0.93 ± 0.02 | 1430.19 ± 55.18 | 0.44 ± 0.01 |
| Embodiment 6 | 1435.09 ± 109.53 | 0.94 ± 0.03 | 1115.46 ± 97.13 | 0.41 ± 0.01 |
| Counter Example 1 | 1413.80 ± 53.36 | 0.84 ± 0.04 | 1371.02 ± 48.85 | 0.30 ± 0.05 |
| Counter Example 2 | 1276.76 ± 82.52 | 0.91 ± 0.03 | 1027.80 ± 98.28 | 0.36 ± 0.03 |
| Counter Example 3 | 1476.73 ± 104.00 | 0.91 ± 0.05 | 980.92 ± 102.69 | 0.35 ± 0.02 |
| Counter Example 4 | 1394.33 ± 112.35 | 0.76 ± 0.05 | 1033.50 ± 207.08 | 0.32 ± 0.04 |
| Counter Example 5 | 1114.98 ± 50.72 | 0.88 ± 0.04 | 962.16 ± 177.76 | 0.376 ± 0.02 |
| Counter Example 6 | 1346.88 ± 133.90 | 0.92 ± 0.03 | 975.26 ± 100.54 | 0.35 ± 0.02 |

TABLE 2-continued

Results of texture test.

| | Hardness/g | Elasticity | Cohesiveness/g | Resilience |
|---|---|---|---|---|
| Counter Example 7 | 1028.38 ± 140.79 | 0.83 ± 0.02 | 763.50 ± 88.08 | 0.33 ± 0.04 |

According to Table 1, the processed fish balls with fillings treated in the embodiments can significantly reduce the soup loss, with the single pre-emulsification 103 group (counter examples 1 to 3) being the second highest and the single group (counter examples 4 to 6) having the highest soup loss rate. 34.30% of the soup loss rate in the 0.4% cortisol pre-emulsification 103 group (counter example 2) was reduced by 25.52% relative to the control group (counter example 7), which is still lower than most of the embodiments. The soup loss of the fish balls (Embodiment 1) made by pre-emulsification 103 of curdlan and konjac gum in the ratio of 3:7 was reduced by 52.22% compared to the control group (counter example 7).

Thus, although the soup loss rate of fish balls made by single emulsification group (counter examples 1 to 3) can be effectively improved, the effect of compound pre-emulsification 103 group (Embodiments 1 to 6) is better. This may be, on the one hand, due to the fact that konjac gum can synergize with carrageenan and curdlan, which in turn improves the quality of surimi gel. On the other hand, carrageenan, konjac gum and curdlan may have emulsified with the oil to form emulsified oil droplets with myosin in the surimi, and the emulsified oil droplets filled into the rougher gel network structure formed by myosin, making the structure more delicate and denser, thus reducing the loss of broth.

The change in quality of the stuffed fish balls by pre-emulsification 103 is assessed according to hardness and elasticity. The stuffed fish balls of the compound pre-emulsification 103 group (Embodiments 1-6) had the highest hardness values, followed by the single pre-emulsification 103 group (counter examples 1 to 3) and the single group (counter examples 4 to 6) had the lowest hardness values. According to Table 2, the trend of soup loss rate and hardness variation are basically the same.

As shown in Table 2, the addition of different hydrocolloids (counter examples 4~6) all had different degrees of effect on the hardness of the outer skin of fish balls. Among them, pair ratio 4 had the greatest effect on the surimi products. In addition to this, although the single group (counter examples 4~6) improved the hardness, elasticity to some extent, the single pre-emulsification 103 group (counter examples 1~3) is significantly better than the addition of single group (counter examples 4~6) in enhancing the outer cortical structure of fish balls.

With the change of the ratio of konjac gum with carrageenan and curdlan compound, the hardness of the example of surimi products showed a trend of first increase and then decrease, compared with the counter examples, the examples have a higher hardness, elasticity, and significantly improve the quality of stuffed fish balls, indicating that within a certain degree, the hydrocolloid compound with surimi protein formed a more dense network structure, and there is a synergistic effect with starch.

As can be seen from Table 1, the brightness of the group with the addition of carrageenan (counter example 3) and curdlan (counter example 2) was higher than that of the group with the addition of konjac gum (counter example 1), probably due to the fact that carrageenan fills the pores of the protein gel during the gelation of surimi, increasing the level of the gel and thus leading to a higher brightness of the surimi. Konjac gum itself is colorless and transparent, added to the surimi gel to improve the transparency of the composite gel, but to a certain extent reduces the brightness of the surimi gel. And the compounding of embodiments 1~6 not only reduces the juice loss, but also increases the brightness.

The present invention provides a low soup loss frozen stuffed fish ball and its preparation method. The present invention adopts the technical solution of combining hydrocolloid and oil pre-emulsification 103 technology, which can effectively solve the taste of powdered, reduce the soup loss of fish balls after freeze-thaw cooking, reduce the soup loss rate of stuffed fish balls from 46.05% to 22.00%, and improve the juicy taste of frozen stuffed fish balls after freeze-thaw cooking. The use of konjac gum and carrageenan or curdlan respectively, combined with oil pre-emulsification 103 technology, can also effectively improve the texture and brightness of the outer skin of fish balls, compared with a single addition, its hardness increased by 11.38%~42.23%, elasticity increased by 4.76%~13.10%, brightness from 80.19 to 81.06, effectively solve the fish balls due to freeze-thaw cycle leading to loosed structure, brightness and other problems. It effectively solves the problems of loosening structure and decreasing brightness due to freeze-thaw cycle.

The method of the invention is simple and easy to use, and can be realized in conventional fish ball production workshops without strict requirements. In addition, it can be widely applied to the current fish ball with fillings products, and can also be applied to other stuffed surimi and minced meat products.

All or portions of the methods in accordance to the embodiments may be executed in one or more fish ball with fillings, surimi, and other processed aquatic food products.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:
1. A method for preparing a low loss-of-soup frozen fish ball with fillings, the method comprising:
   pre-emulsifying a polysaccharide solution with edible oil;
   adding a surimi and mixing with tapioca starch and water to obtain a fish ball outer skin with low soup loss; and
   using the fish ball outer skin to wrap fillings to make the low loss-of-soup frozen fish ball with fillings.

2. The method of claim 1, wherein said polysaccharide solution further comprises solute and solvent;
wherein the solute is a mixture of konjac gum and curdlan or carrageenan;
wherein the solute for konjac gum to curdlan or carrageenan having a mass ratio of 9~5:5~1;
wherein the solvent is water.

3. The method of claim 1, further comprising: a mass ratio, polysaccharide solution:tapioca starch:edibleoil:water:surimi, of 0.3:15~20:15~20:18:49~50.

4. The method of claim 1, further comprising: said pre-emulsifying having an oil to water ratio of 3:2.

5. The method of claim 1, further comprising:
semi-thawing: thawing the frozen surimi at 4° C. to a central temperature of −5 to −2° C.;
air chopping: cutting the semi-thawed surimi into small pieces, adding a phosphate and chopping;
salt chopping: adding salt to the air chopped surimi and chopping to obtain the treated surimi;
mix chopping: dissolving the polysaccharide substance in water, mixing with edible oil for pre-emulsification, adding to the treated surimi, chopping and mixing well with tapioca starch and the remaining water to obtain the outer skin for low-loss-of-soup frozen fish ball;
preparing the filling: chopping lean meat into minced meat, adding salt, and mixing well, then adding a phosphate, a plurality of auxiliary ingredients, green onion and ginger water and chopping until the slurry is uniform and fine to obtain a stuffed fish ball filling;
heating and molding: the outer skin material is wrapped around the filling to prepare fish balls, gelatinized and formed by the two-stage heating method;
cooling and quick-freezing: the heated gelatinized fish balls are placed in cold water for cooling and quick-freezing; and
freezing and storing: freezing and storing below −18° C. after package.

6. The method of claim 5, wherein said phosphate of said air chopping is a mixture of sodium tripolyphosphate, sodium hexametaphosphate and sodium pyrophosphate in a mass ratio of 1:1:1, wherein the mass ratio of phosphate to semi-thawed surimi is 0.05~0.09:49~50.

7. The method of claim 5, wherein said salt chopping further comprises salt and air chopped surimi has a mass ratio of 1.5~2:49~50.

8. The method of claim 5, wherein said phosphate in preparing the filling is a mixture of sodium tripolyphosphate, sodium hexametaphosphate, sodium pyrophosphate, wherein the mixture has a mass ratio of 1:1:1;
wherein said green onion and ginger water is a mixture of green onion foam, ginger foam, water in a mass ratio of 3:3:4;
wherein said plurality of auxiliary ingredients are lard, soy sauce, Chinese 13 Spice Seasoning in a mass ratio of 20:2:1:1;
wherein said lean meat, said salt, said phosphate, said plurality of auxiliary ingredients, said green onion and ginger water has a mass ratio of 50:2:0.03:23:25.

9. The method of claim 5, wherein said two-stage heating method of said heating and molding comprises heating at 40° C. in a water bath for 30 min, and heating at 90° C. in a water bath for 20 min.

10. The method of claim 5, wherein said cooling and quick-freezing comprises placing in 4° C. cold water and cooling until the central of the fish balls reach below 10° C. and quick-freezing.

* * * * *